United States Patent
Yu et al.

(10) Patent No.: US 10,585,573 B2
(45) Date of Patent: Mar. 10, 2020

(54) METHOD AND SYSTEM FOR ZOOMING-IN PICTURE ON MOBILE TERMINAL

(71) Applicant: HuiZhou TCL Mobile Communication Co., Ltd., HuiZhou (CN)

(72) Inventors: Bin Yu, HuiZhou (CN); Weiqin Yang, HuiZhou (CN)

(73) Assignee: HuiZhou TCL Mobile Communications Co., Ltd., HuiZhou (CN)

( * ) Notice: Subject to any disclaimer, the term of this patent is extended or adjusted under 35 U.S.C. 154(b) by 261 days.

(21) Appl. No.: 15/506,288

(22) PCT Filed: Jul. 29, 2016

(86) PCT No.: PCT/CN2016/092327
§ 371 (c)(1),
(2) Date: Feb. 24, 2017

(87) PCT Pub. No.: WO2017/096922
PCT Pub. Date: Jun. 15, 2017

(65) Prior Publication Data
US 2018/0107366 A1      Apr. 19, 2018

(30) Foreign Application Priority Data
Dec. 8, 2015   (CN) .......................... 2015 1 0895478

(51) Int. Cl.
*G06F 3/0484*   (2013.01)
*G06F 3/0488*   (2013.01)
*G06T 3/40*     (2006.01)

(52) U.S. Cl.
CPC ........ *G06F 3/04845* (2013.01); *G06F 3/0488* (2013.01); *G06T 3/4038* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS

| 2002/0081092 A1* | 6/2002 | Ozawa ..................... G09G 5/00 386/230 |
| 2007/0252821 A1* | 11/2007 | Hollemans ............ G06F 3/0416 345/173 |
| 2009/0051671 A1* | 2/2009 | Konstas .............. G06F 3/04886 345/174 |

(Continued)

FOREIGN PATENT DOCUMENTS

| CN | 1969254 A | 5/2007 |
| CN | 102253749 A | 11/2011 |

(Continued)

*Primary Examiner* — Kent W Chang
*Assistant Examiner* — Benjamin Morales

(57) ABSTRACT

A method for zooming-in a picture on a mobile terminal may comprise: partitioning, by a picture partitioning module, a picture into an array formed by M×N rectangles; acquiring rectangles of two touch points when a touch detection module detects that there are two touch points on the picture; and zooming-in, by a display and zoom-in module, a rectangular array between rows and columns of the rectangles of the two touch points.

11 Claims, 2 Drawing Sheets

(56) References Cited

U.S. PATENT DOCUMENTS

| | | | |
|---|---|---|---|
| 2011/0304590 A1 | 12/2011 | Su | |
| 2012/0320073 A1* | 12/2012 | Mason | G06F 3/1431 |
| | | | 345/581 |
| 2014/0059481 A1* | 2/2014 | Lee | G06F 3/0488 |
| | | | 715/784 |
| 2014/0085237 A1* | 3/2014 | Choi | G06F 3/04883 |
| | | | 345/173 |
| 2016/0026357 A1* | 1/2016 | Fang | G06F 3/04883 |
| | | | 345/173 |
| 2016/0320953 A1* | 11/2016 | Pan | G06F 3/0486 |

FOREIGN PATENT DOCUMENTS

| | | |
|---|---|---|
| CN | 102793565 A | 11/2012 |
| CN | 104731494 A | 6/2015 |
| CN | 105511788 A | 4/2016 |
| CN | 103558957 A | 2/2017 |

* cited by examiner

METHOD AND SYSTEM FOR ZOOMING-IN PICTURE ON MOBILE TERMINAL

TECHNICAL FIELD

The present invention relates to general image data processing and in particular to a method and system for zooming-in a picture on a mobile terminal.

BACKGROUND OF THE PRESENT INVENTION

At present, as the resolution of a camera for a mobile terminal becomes higher, pictures photographed by the camera may become larger and larger in size. However, considering portability, the screen of the mobile terminal may generally be not more than 6 inches, so some details may not be viewed clearly when these large pictures are displayed on the screen. Consequently, these pictures may need to be zoomed-in for viewing. In the prior art, zooming-in a picture on a mobile terminal may generally be realized by sliding two fingers on the touch screen in opposite directions, but this zoom-in method may be difficult to use to ensure zoom-in precision. Moreover, as the slide operations of two fingers may not be consistent every time, it may often be difficult to achieve a purpose of zooming-in a same region for two times.

Therefore, further improvements and developments are needed in the prior art.

SUMMARY OF THE PRESENT INVENTION

In view of the deficiencies in the prior art, in order to solve the defects and deficiencies in the prior art, the present invention provides a method and system for zooming-in a picture, which can achieve the purpose of zooming-in a large picture by a fuzzy operation, and can also increase the zoom-in precision and achieve the purpose of zooming-in a same region by multiple times of operation, so that it is convenient for a user to zoom-in or zoom-out a picture for use.

To solve the technical problem, the present invention employs the following technical solutions.

A method for zooming-in a picture on a mobile terminal is provided, including the following steps of:

partitioning a picture into an array formed by M×N rectangles, and assigning a serial number to each of the rectangles in the array according to a row position and a column position of this respective rectangle in the array, wherein the serial numbers are set by an array storage structure;

acquiring rectangles in which two touch points are located when detecting that there are two touch points on the picture; and zooming-in a rectangular array between rows and columns of the acquired rectangles in which the two touch points are located.

As a further improved solution, the acquiring rectangles of two touch points when detecting that there are two touch points on the picture specifically includes the following steps of:

acquiring coordinates (x,y) of the two touch points on a touch screen of the mobile terminal; and determining a rectangular range of the x-coordinate value x and the y-coordinate value y of the coordinates (x,y) of each of the two touch points in the array, to determine rectangles in which the two touch points are located.

As a further improved solution, zooming-in a rectangular array between rows and columns of the rectangles of the two touch points specifically includes the following steps of:

searching row and column positions of the rectangles in which the two touch points are located according to the serial numbers of the rectangles; and determining and zooming-in a rectangular array between rows and columns of the rectangles in which the two touch points are located.

In an embodiment, rectangles in the array are numbered as [a][b], where a and b satisfy the following conditions: $1 \leq a \leq M$ and $1 \leq b \leq M$; when a rectangular range of the x-coordinate value x and y-coordinate value y of the coordinates (x,y) of a touch point in the array is determined, and if $x[a_1][b_1] \leq x < x[a_1][b_1]'$ and $y[a_1][b_1] \leq y < y[a_1][b_1]'$, the coordinates (x,y) of the touch point are located with a rectangle numbered as $[a_1][b_1]$, where $x[a_1][b_1]$ is an x-coordinate of a bottom left corner of the rectangle numbered as $[a_1][b_1]$, $y[a_1][b_1]$ is a y-coordinate of the bottom left corner of the rectangle numbered as $[a_1][b_1]$, $x[a_1][b_1]'$ is an x-coordinate of a top right corner of the rectangle numbered as $[a_1][b_1]$, and $y[a_1][b_1]'$ is a y-coordinate of the top right corner of the rectangle numbered as $[a_1][b_1]$.

A method for zooming-in a picture on a mobile terminal is provided, including the following steps of:

partitioning a picture into an array formed by M×N rectangles;

acquiring rectangles in which two touch points are located when detecting that there are two touch points on the picture; and zooming-in a rectangular array between rows and columns of the rectangles of the two touch points.

In an embodiment, after the step of partitioning a picture into an array formed by M×N rectangles, the method further includes: assigning a serial number to each of the rectangles according to a row position and a column position of this rectangle in the array.

In an embodiment, the acquiring rectangles of two touch points when detecting that there are two touch points on the picture includes the following steps of:

acquiring coordinates (x,y) of the two touch points on a touch screen of the mobile terminal; and determining a rectangular range of the x-coordinate value x and the y-coordinate value y of the coordinates (x,y) of each of the two touch points in the array, to determine rectangles in which the two touch points are located.

In an embodiment, zooming-in a rectangular array between rows and columns of the rectangles of the two touch points includes the following steps of:

searching row and column positions of the rectangles in which the two touch points are located according to the serial numbers of the rectangles; and determining and zooming-in a rectangular array between rows and columns of the rectangles in which the two touch points are located.

In an embodiment, rectangles in the array are numbered as [a][b], where a and b satisfy the following conditions: $1 \leq a \leq M$ and $1 \leq b \leq N$; when a rectangular range of the x-coordinate value x and y-coordinate value y of the coordinates (x,y) of a touch point in the array is determined, and if $x[a_1][b_1] \leq x < x[a_1][b_1]'$ and $y[a_1][b_1] \leq y < y[a_1][b_1]'$, the coordinates (x,y) of the touch point are located with a rectangle numbered as $[a_1][b_1]$, where $x[a_1][b_1]$ is an x-coordinate of a bottom left corner of the rectangle numbered as $[a_1][b_1]$, $y[a_1][b_1]$ is a y-coordinate of the bottom left corner of the rectangle numbered as $[a_1][b_1]$, $x[a_1][b_1]'$ is an x-coordinate of a top right corner of the rectangle numbered as $[a_1][b_1]$, and y[$a_1$][$b_1$]' is a y-coordinate of the top right corner of the rectangle numbered as [$a_1$][$b_1$].

In an embodiment, a system for zooming-in a picture on a mobile terminal may include the mobile terminal including a touch screen, wherein the system includes a picture partitioning module, a touch detection module and a display and zoom-in module;

the picture partitioning module may be configured to partition a picture into an array formed by M×N rectangles;

the touch detection module may be configured to detect whether the touch screen is touched, and acquire rectangles in which two touch points are located when detecting that there are two touch points on the picture; and the display and zoom-in module may be configured to zoom-in a rectangular array between rows and columns of the rectangles of the two touch points.

In an embodiment, after partitioning a picture into an array formed by M×N rectangles, the picture partitioning module may further assign a serial number to each of the rectangles according to a row position and a column position of this rectangle in the array.

In an embodiment, the touch detection module may be configured to acquire coordinates (x,y) of the two touch points on a touch screen of the mobile terminal; and determine a rectangular range of the x-coordinate value x and the y-coordinate value y of the coordinates (x,y) of each of the two touch points in the array, to determine rectangles in which the two touch points are located.

In an embodiment, the display and zoom-in module is may be configured to search row and column positions of the rectangles in which the two touch points are located according to the serial numbers of the rectangles; and determine and zoom-in a rectangular array between rows and columns of the rectangles in which the two touch points are located.

In an embodiment, the picture partitioning module can number a rectangle in the array as [a][b], where a and b satisfy the following conditions: 1≤a≤M and 1≤b≤N; when the touch detection module determines a rectangular range of the x-coordinate value x and y-coordinate value y of the coordinates (x,y) of a touch point in the array, and if x[$a_1$][$b_1$]≤x<x[$a_1$][$b_1$]' and y[$a_1$][$b_1$]≤y<y[$a_1$][$b_1$]', the coordinates (x,y) of the touch point are located within a rectangle numbered as [$a_1$][$b_1$], wherein x[$a_1$][$b_1$] is an x-coordinate of a bottom left corner of the rectangle numbered as [$a_1$][$b_1$], y[$a_1$][$b_1$] is a y-coordinate of the bottom left corner of the rectangle numbered as [$a_1$][$b_1$], x[$a_1$][$b_1$]' is an x-coordinate of a top right corner of the rectangle numbered as [$a_1$][$b_1$], and y[$a_1$][$b_1$]' is a y-coordinate of the top right corner of the rectangle numbered as [$a_1$][$b_1$].

In contrast to the prior art, the present invention, by performing rectangle partitioning and assigning numbers on a picture, and zooming-in a rectangular array between rows and columns of two touch points when the touch screen detects that there are two touch points, does not require performing slide operations in opposite directions by two fingers so that the operation difficulty of inconsistent slide operations of two fingers can be avoided. Thus, the operation of zooming-in the picture can be more convenient, and the purpose of zooming-in the picture by a fuzzy operation can be achieved. The content of the picture can be zoomed-in within the range of rows and columns of two touch points as long as there are two touch points on the touch screen, so that the operation precision is can be improved.

DETAILED DESCRIPTION OF THE PRESENT INVENTION

To make the objectives, technical solutions and advantages of the present invention understood more clear, the present invention will be further described below in detail by embodiments with reference to the accompanying drawings. It should be understood that the specific embodiments described herein are merely for explaining the present invention and not intended to limit the present invention.

Figure 1:
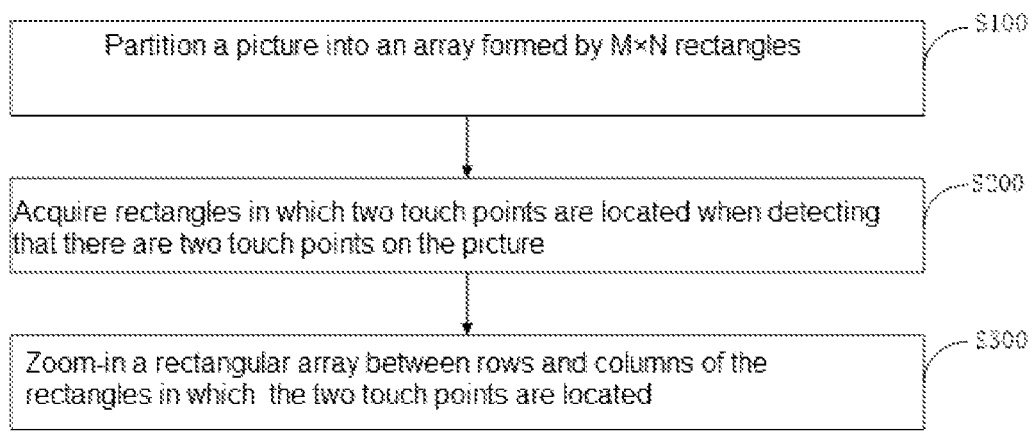
FIG. 1 is a flowchart of an embodiment of a method for zooming-in a picture on a mobile terminal according to the present invention.

The present invention provides a method for zooming-in a picture on a mobile terminal, which zooms-in a picture by means of a fuzzy operation. This method is applied to the operation to a picture on a mobile terminal with a touch screen. A preferred implementation flow of the method is as shown in FIG. 1.

Figure 2:
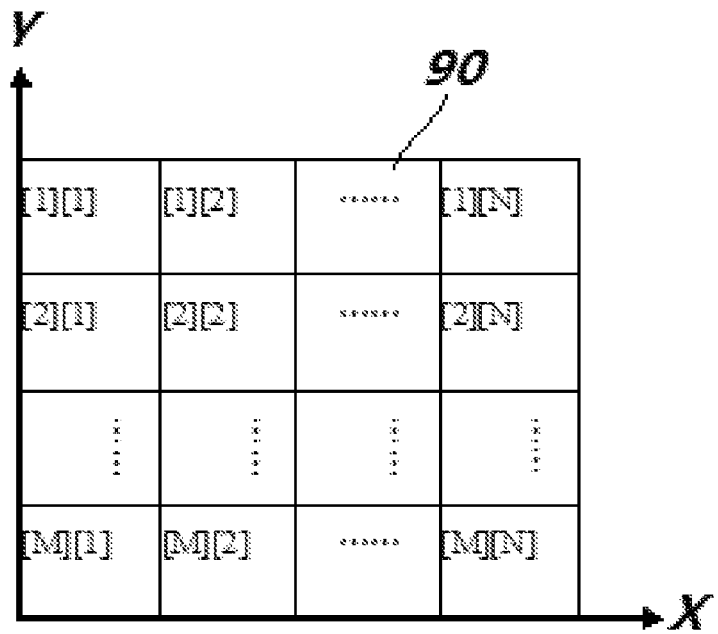
FIG. 2 is a schematic diagram of partitioning a picture into rectangular arrays in an embodiment of the method for zooming-in a picture on a mobile terminal according to the present invention.

S100: A picture is partitioned into an array formed by M×N rectangles as shown in FIG. 2. In FIG. 2, picture 90 is partitioned into M×N arrays. Each of the rectangles in the array is numbered according to a row position and a column position of this rectangle in the array. The serial numbers are expressed as follows by an array storage structure: [1][1], . . . , [1][N], . . . [M][1], . . . [M][N]. In other words, the serial number of a certain rectangle in the array is set as [a][b], where a and b satisfy the following conditions: 1≤a≤M and 1≤b≤N.

S200: Rectangles of two touch points are acquired when it is detected that there are two touch points on the picture. The specific steps may be as follows:

First, coordinates (x,y) of the two touch points on the touch screen of the mobile terminal are acquired. For a mobile terminal with a touch screen, when a picture operation is performed, it is required to detect touch points on the touch screen. In an embodiment of this method, during an operation of zooming-in the picture by touch points, the operation of zooming-in the picture can be confirmed only when two touch points are locked. Otherwise, the detection operation may be aborted and it may be required to perform detection again. When the locked touch points need to be touched on the touch screen, the system of the mobile terminal may acquire coordinates of the touch points, and determine that the coordinates of the detected touch point have been locked only when the coordinates of each touch pint remains unchanged within a predetermined time. At this time, a position of a picture rectangle of the coordinates of the touch point in the array can be further determined.

Then, a rectangular range of the x-coordinate value x and the y-coordinate value y of the coordinates (x,y) of each of the two touch points in the array is determined, to determine rectangles in which the two touch points are located. During determining the rectangles in which the touch points are located, it may be required to calculate coordinates (x,y) of the two touch points. As the calculation process of the coordinates of the two touch points may be the same, the description will be illustrated by taking the coordinates (x,y) of one touch point as an example. If it is determined that x[$a_1$][$b_1$]≤x<x[$a_1$][$b_1$]', and y[$a_1$][$b_1$]≤y<y[$a_1$][$b_1$]', the coordinates (x,y) of the touch point are located within a rectangle numbered as [$a_1$][$b_1$], where x[$a_1$][$b_1$] is an x-coordinate of a bottom left corner of the rectangle numbered as $[a_1][b_1]$, $y[a_1][b_1]$ is a y-coordinate of the bottom left corner of the rectangle numbered as $[a_1][b_1]$, $x[a_1][b_1]'$ is an x-coordinate of a top right corner of the rectangle numbered as $[a_1][b_1]$, and $y[a_1][b_1]'$ is a y-coordinate of the top right corner of the rectangle numbered as $[a_1][b_1]$.

S300: A rectangular array between rows and columns of the rectangles of the two touch points is shown as zoomed-in. The zooming-in operation is performed in accordance with the serial numbers of the rectangles of the two touch points obtained in S200. Row and column positions of the rectangles of the two touch points are searched according to the serial numbers of the rectangles, and the rectangular array between the rows and columns of the rectangles in which the two touch points are located is determined and then zoomed-in for displaying. In the example of searching the serial numbers of rectangles according to the coordinates (x,y) of the touch points in step S200, after the serial numbers [a][b] of the rectangles of the two touch points are determined, the system can zoom-in and display a region formed by the rectangular array between rows and columns of the two touch points according to the serial numbers of the rectangles of the two touch points. If the two touch points are $[a_1][b_1]$ and $[a_2][b_2]$, respectively, the rectangles to be zoomed-in include all rectangles numbered as $[a_z][b_z]$, where $a_1 \leq a_z \leq a_2$, and $b_1 \leq b_z \leq b_2$.

Figure 3:
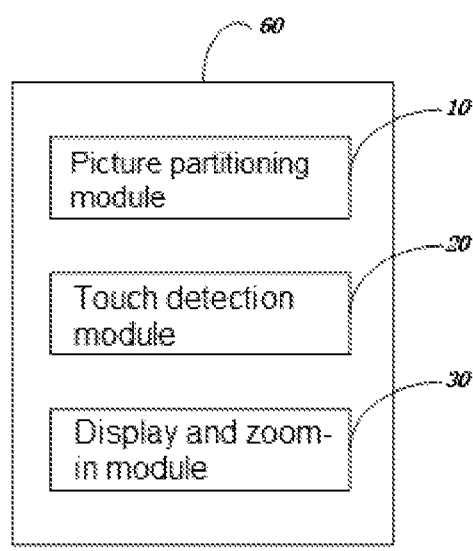
FIG. 3 is a principle structure diagram of a an embodiment of a system for zooming-in a picture on a mobile terminal according to the present invention.

The present invention further provides a system for zooming-in a picture on a mobile terminal. The mobile terminal may include a touch screen. As shown in FIG. 3, the system 60 of the mobile terminal includes a picture partitioning module 10, a touch detection module 20 and a display and zoom-in module 30.

The picture partitioning module 10 may be configured to partition a picture into an array formed by M×N rectangles; the touch detection module 20 may be configured to detect whether the touch screen is touched, and acquire rectangles of two touch points when detecting that there are two touch points on the picture; and the display and zoom-in module 30 may be configured to zoom-in a rectangular array between rows and columns of the rectangles in which the two touch points are located.

After partitioning a picture into an array formed by M×N rectangles, the picture partitioning module 10 further numbers each of the rectangles according to a row position and a column position of this rectangle in the array. The picture partitioning module 10 numbers the rectangles in the array as [a][b], wherein a and b satisfy the following conditions: $1 \leq a \leq M$, and $1 \leq b \leq N$.

The touch detection module 20 is configured to acquire coordinates (x,y) of the two touch points on the touch screen of the mobile terminal; and determine a rectangular range of the x-coordinate value x and the y-coordinate value y of the coordinates (x,y) of each of the two touch points in the array, to determine rectangles in which the two touch points are located. In the process of acquiring the coordinates (x,y) of the two touch points on the touch screen of the mobile terminal, when a picture operation is performed, it may be required to detect touch points on the touch screen. During an operation of zooming-in the picture by touch points, the operation of zooming-in the picture can be confirmed only when two touch points are locked. Otherwise, the detection operation may be aborted and it may be required to perform detection again. When the locked touch points need to be touched on the touch screen, the system of the mobile terminal may acquire coordinates of the touch points, and determine that the coordinates of the detected touch point have been locked only when the coordinates of each touch pint remains unchanged within a predetermined time. At this time, a position of a picture rectangle of the coordinates of the touch point in the array can be further determined. Then, the touch detection module 20 further needs to determine a rectangular range of the x-coordinate value x and the y-coordinate value y of the coordinates (x,y) of each of the two touch points in the array. During implementation, it may be required to calculate coordinates (x,y) of the two touch points. As the calculation process of the coordinates of the two touch points is the same, the description will be illustrated by taking the coordinates (x,y) of one touch point as an example. If it is determined that $x[a_1][b_1] \leq x < x[a_1][b_1]'$ and $y[a_1][b_1] \leq y < y[a_1][b_1]'$, the coordinates (x,y) of the touch point may be located within a rectangle numbered as $[a_1][b_1]$, where $x[a_1][b_1]$ is an x-coordinate of a bottom left corner of the rectangle numbered as $[a_1][b_1]$, $y[a_1][b_1]$ is a y-coordinate of the bottom left corner of the rectangle numbered as $[a_1][b_1]$, $x[a_1][b_1]'$ is an x-coordinate of a top right corner of the rectangle numbered as $[a_1][b_1]$, and $y[a_1][b_1]'$ is a y-coordinate of the top right corner of the rectangle numbered as $[a_1][b_1]$.

The display and zoom-in module 30 is configured to search row and column positions of the rectangles of the two touch points according to the serial numbers of the rectangles; and the display and zoom-in module 30 may determine and zoom-in a rectangular array between rows and columns of the rectangles of the two touch points. The zoom-in operation can be performed in accordance with the serial numbers of the rectangles of the two touch points detected by the touch detection module 20. Row and column positions of the rectangles of the two touch points can be searched according to the serial numbers of the rectangles, and the rectangular array between the rows and columns of the rectangles of the two touch points is can be determined and then zoomed-in for displaying. After the serial numbers [a][b] of the rectangles of the two touch points are determined, the system can zoom-in and display a region formed by the rectangular array between rows and columns of the two touch points according to the serial numbers of the rectangles of the two touch points. If the two touch points are $[a_1][b_1]$ and $[a_2][b_2]$, respectively, the rectangles to be zoomed-in may include all rectangles numbered as $[a_z][b_z]$, where $a_1 \leq a_z \leq a_2$, and $b_1 \leq b_z \leq b_2$.

In an embodiment, a picture is partitioned into an array formed by M×N rectangles, and each of the rectangles in the array is numbered; when it is detected that the touch screen is touched, the number of touch points is acquired after coordinates of the detected touch points are locked, and serial numbers of rectangles of the touch points in the array are determined if the number is 2; and a region in the picture to be zoomed-in is determined according to the serial numbers of the two rectangles, and then zoomed-in for displaying. In the present invention, the purpose of zooming-in and displaying a picture by a fuzzy operation is achieved, the zoom-in precision is increased, the purpose of zooming-in a same region by multiple operations, and it is convenient for a user to use.

It should be understood that the foregoing description merely shows an embodiment of the present invention and is not intended to limit the technical solutions of the present invention. A person of ordinary skill in the art can make additions/deletions, replacements, transformations or improvements to the foregoing description within the spirit and principle of the present invention, and all the added/deleted, replaced, transformed or improved technical solutions fall into the protection scope defined by the appended claims of the present invention.

The invention claimed is:

1. A method for zooming-in a picture on a mobile terminal, comprising:

partitioning a picture into an array formed by M×N rectangles, and assigning a serial number to each of the rectangles in the array according to a row and column position of this rectangle in the array, wherein the serial number is set by an array storage structure;

in response to detecting that there are two touch points on the picture, acquiring two rectangles in which the two touch points are located, respectively, wherein detecting occurs when coordinates of the two touch points have remained unchanged for a predetermined time; and zooming-in a rectangular array of rectangles between rows and columns of the acquired rectangles in which the two touch points are located, wherein, when the two touch points are $[a_1][b_1]$ and $[a_2][b_2]$, respectively, the rectangles to be zoomed-in may include all rectangles numbered as $[a_z][b_z]$, where $a_1 \Leftarrow a_z \Leftarrow a_2$, and $b_1 \Leftarrow b_z \Leftarrow b_2$, wherein rectangles in the array are numbered as $[a][b]$, where a and b satisfy the following conditions: $1 \leq a \leq M$ and $1 \leq b \leq N$; when a rectangular range of the x-coordinate value x and y-coordinate value y of the coordinates (x,y) of a first one of the two touch points in the array is determined, and if $x[a_1][b_1] \leq x < x[a_1][b_1]'$ and $y[a_1][b_1] \leq y < y[a_1][b_1]'$, the coordinates (x,y) of the first one of the two touch points are located within a rectangle numbered as $[a_1][b_1]$, where $x[a_1][b_1]$ is an x-coordinate of a bottom left corner of the rectangle, $y[a_1][b_1]$ is a y-coordinate of the bottom left corner of the rectangle numbered as $[a_1][b_1]$, $x[a_1][b_1]'$ is an x-coordinate of a top right corner of the rectangle numbered as $[a_1][b_1]$, and $y[a_1][b_1]'$ is a y-coordinate of the top right corner of the rectangle numbered as $[a_1][b_1]$.

2. The method for zooming-in a picture on a mobile terminal according to claim 1, wherein the acquiring rectangles in which the two touch points are located when detecting that there are two touch points on the picture comprises:

acquiring coordinates (x,y) of the two touch points on a touch screen of the mobile terminal; and determining a rectangular range of an x-coordinate value x and a y-coordinate value y of the coordinates (x,y) of each of the two touch points in the array, thereby determining the acquired rectangles in which the two touch points are located.

3. The method for zooming-in a picture on a mobile terminal according to claim 2, wherein zooming-in a rectangular array between rows and columns of the rectangles in which the two touch points are located comprises:

searching row and column positions of the acquired rectangles in which the two touch points are located according to serial numbers of the acquired rectangles; and determining and zooming-in a rectangular array between rows and columns of the acquired rectangles in which the two touch points are located.

4. A method for zooming-in a picture on a mobile terminal, comprising:

partitioning a picture into an array formed by M×N rectangles;

in response to detecting that there are two touch points on the picture, acquiring two rectangles in which two touch points are located, respectively, wherein detecting occurs when coordinates of the two touch points have remained unchanged for a predetermined time; and zooming-in a rectangular array of rectangles between rows and columns of the acquired rectangles of the two touch points, wherein, when the two touch points are $[a_1][b_1]$ and $[a_2][b_2]$, respectively, the rectangles zoomed-in on include all rectangles numbered as $[a_z][b_z]$, where $a_1 \Leftarrow a_z \Leftarrow a_2$ and $b_1 \Leftarrow b_z \Leftarrow b_2$, wherein rectangles in the array are numbered as $[a][b]$, where a and b satisfy the following conditions: $1 \leq a \leq M$ and $1 \leq b \leq N$; when a rectangular range of the x-coordinate value x and y-coordinate value y of the coordinates (x,y) of a first one of the two touch points in the array is determined, and if $x[a_1][b_1] \leq x < x[a_1][b_1]'$ and $y[a_1][b_1] \leq y < y[a_1][b_1]'$, the coordinates (x,y) of the first one of the two touch points are located within a rectangle numbered as $[a_1][b_1]$, where $x[a_1][b_1]$ is an x-coordinate of a bottom left corner of the rectangle, $y[a_1][b_1]$ is a y-coordinate of the bottom left corner of the rectangle numbered as $[a_1][b_1]$, $x[a_1][b_1]'$ is an x-coordinate of a top right corner of the rectangle numbered as $[a_1][b_1]$, and $y[a_1][b_1]'$ is a y-coordinate of the top right corner of the rectangle numbered as $[a_1][b_1]$.

5. The method for zooming-in a picture on a mobile terminal according to claim 4, after the step of partitioning a picture into an array formed by M×N rectangles, further comprising:

assigning a serial number for each of the acquired rectangles according to a row position and a column position of this rectangle in the array.

6. The method for zooming-in a picture on a mobile terminal according to claim 5, wherein the acquiring rectangles of two touch points when detecting that there are two touch points on the picture specifically comprises:

acquiring coordinates (x,y) of the two touch points on a touch screen of the mobile terminal; and determining a rectangular range of an x-coordinate value x and an y-coordinate value y of the coordinates (x,y) of each of the two touch points in the array, so as to determine the acquired rectangles in which the two touch points are located.

7. The method for zooming-in a picture on a mobile terminal according to claim 6, wherein zooming-in a rectangular array between rows and columns of the rectangles of the two touch points includes:

searching row and column positions of the acquired rectangles in which the two touch points are located according to the serial numbers of the rectangles;

determining and zooming-in a rectangular array between rows and columns of the acquired rectangles in which the two touch points are located.

8. A system for zooming-in a picture on a mobile terminal, the mobile terminal comprising a touch screen, wherein the system comprises a picture partitioning module, a touch detection module and a display and zoom-in module;

the picture partitioning module is configured to partition a picture into an array formed by M×N rectangles;

the touch detection module is configured to detect whether the touch screen is touched, and in response to detecting that there are two touch points on the picture, acquire two rectangles in which two touch points are located, respectively, wherein detecting occurs when coordinates of the two touch points have remained unchanged for a predetermined time; and the display and zoom-in module is configured to zoom-in a rectangular array of rectangles between rows and columns of the acquired rectangles of the two touch points, wherein, when the two touch points are $[a_1][b_1]$ and $[a_2][b_2]$, respectively, the rectangles zoomed-in on include all rectangles numbered as $[a_z][b_z]$, where $a_1 \Leftarrow a_z \Leftarrow a_2$ and $b_1 \Leftarrow b_z \Leftarrow b_2$, wherein rectangles in the array are numbered as $[a_1][b_1]$, where a and b satisfy the following conditions: $1 \leq a \leq M$ and $1 \leq b \leq N$; when a rectangular range of the x-coordinate value x and y-coordinate value y of the coordinates (x,y) of a first one of the two touch points in the array is determined, and if $x[a_1][b_1] \leq x < x[a_1][b_1]'$ and $y[a_1][b_1] \leq y < y[a_1][b_1]'$, the coordinates (x,y) of the first one of the two touch points are located within a rectangle numbered as $[a_1][b_1]$, where $x[a_1][b_1]$ is an x-coordinate of a bottom left corner of the rectangle, $y[a_1][b_1]$ is a y-coordinate of the bottom left corner of the rectangle numbered as $[a_1][b_1]$, $x[a_1][b_1]'$ is an x-coordinate of a top right corner of the rectangle numbered as $[a_1][b_1]$, and $y[a_1][b_1]'$ is a y-coordinate of the top right corner of the rectangle numbered as $[a_1][b_1]$.

9. The system for zooming-in a picture on a mobile terminal according to claim 8, wherein, after partitioning a picture into an array formed by M×N rectangles, the picture partitioning module further assigns a serial number to each of the M×N rectangles according to a row position and a column position of this rectangle in the array.

10. The system for zooming-in a picture on a mobile terminal according to claim 9, wherein the touch detection module is configured to acquire coordinates (x,y) of the two touch points on a touch screen of the mobile terminal; and determine a rectangular range of the x-coordinate value x and the y-coordinate value y of the coordinates (x,y) of each of the two touch points in the array, to determine the acquired rectangles in which the two touch points are located.

11. The system for zooming-in a picture on a mobile terminal according to claim 10, wherein the display and zoom-in module is configured to search row and column positions of the acquired rectangles in which the two touch points are located according to the serial numbers of the rectangles; and the display and zoom-in module is configured to determine and zoom-in a rectangular array between rows and columns of the acquired rectangles in which the two touch points are located.

* * * * *